United States Patent
Bernard et al.

(10) Patent No.: US 7,902,818 B2
(45) Date of Patent: Mar. 8, 2011

(54) INDUCTIVE PROXIMITY DETECTOR WITH SWITCHED WINDINGS

(75) Inventors: Jacques Bernard, l'isle d'espagnac (FR); Michel Emmanuel, Chazelles (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 348 days.

(21) Appl. No.: 12/169,335

(22) Filed: Jul. 8, 2008

(65) Prior Publication Data

US 2009/0021248 A1  Jan. 22, 2009

(30) Foreign Application Priority Data

Jul. 20, 2007 (FR) ...................................... 07 56650

(51) Int. Cl.
  *G01B 7/14* (2006.01)
(52) U.S. Cl. ................ 324/207.26; 324/207.16
(58) Field of Classification Search ............ 324/207.26, 324/207.16
  See application file for complete search history.

(56) References Cited

U.S. PATENT DOCUMENTS 5,729,143 A * 3/1998 Tavernetti et al. ............ 324/329
6,799,140 B2 * 9/2004 Bernard et al. ................ 702/151

FOREIGN PATENT DOCUMENTS

DE  32 28 524 A1  2/1984
DE  43 30 140 A1  3/1995

* cited by examiner

*Primary Examiner* — Reena Aurora
(74) *Attorney, Agent, or Firm* — Oblon, Spivak, McClelland, Maier & Neustadt, L.L.P.

(57) ABSTRACT

The invention relates to an inductive proximity detector comprising an oscillating circuit excited with resonance by a generator and comprising a detection coil sensitive to a metal target to be detected, wherein the oscillating circuit comprises a reference coil arranged to present a mutual inductance with respect to the metal target to be detected that is substantially lower than that of the detection coil with respect to the metal target, the oscillating circuit comprises a switch able to assume two positions to connect each coil alternately, the detector comprises processing means connected to the coils making it possible to determine the presence or absence of the metal target close to the detector.

12 Claims, 1 Drawing Sheet

INDUCTIVE PROXIMITY DETECTOR WITH SWITCHED WINDINGS

The present invention relates to an inductive proximity detector making it possible to detect a metal target, whatever the nature of the target (steel, stainless steel, aluminium, brass, etc.).

Inductive proximity detectors are well known contactless sensors which make it possible to detect the presence of a target, like a metal object, when the latter is placed in the detection zone of the detector. They provide either a binary output signal indicating the presence or absence of a target, or an analogue output signal, dependent on the distance of the target from the detector.

U.S. Pat. No. 5,624,733 discloses an inductive proximity detector making it possible to detect the presence of a metal target. This detector comprises an oscillator circuit in which is placed a transmission coil and two detection coils separated by the transmission coil, connected in series and wound in reverse direction so as to produce a differential voltage. When a metal target is brought within range, the differential voltage is cancelled.

The configuration described in this document makes it possible to detect different metal objects, whatever their nature (steel, stainless steel, aluminium, brass, etc.). However, this detector offers a very high sensitivity associated with the positioning of its coils.

The aim of the invention is to propose an inductive proximity detector making it possible to detect, reliably over time, the presence of a metal target, whatever its nature (steel, stainless steel, aluminium, brass, etc.). The inventive detector is notably less sensitive to a positioning defect of its coils and is not disturbed by temperature drifts that can influence the result of the detection.

This aim is achieved by an inductive proximity detector comprising an oscillating circuit excited with resonance by a generator and comprising a detection coil sensitive to a metal target to be detected, characterized in that:
  the oscillating circuit comprises a reference coil arranged to present a mutual inductance with respect to the metal target to be detected that is substantially lower than that of the detection coil with respect to the metal target,
  the oscillating circuit comprises a switch able to assume two positions to connect each coil alternately,
  the detector comprises processing means connected to the coils making it possible to determine the presence or absence of the metal target close to the detector.

According to the invention, the coils are manufactured in the same technology and therefore both drift with temperature and over time in an equivalent manner.

According to the invention, the generator and the processing means are, for example, common to both coils and the oscillating circuit comprises a capacitor which is also common to both coils.

According to a particular feature, the processing means comprise means of determining the frequency of the signal measured when the switch is in each of its positions.

According to another particular feature, the processing means subtract a reference frequency from the measured frequency.

According to another particular feature of the invention, the processing means determine a frequency difference from the oscillation frequencies of the oscillating circuit for each position of the switch and compare the difference obtained with a threshold value obtained from learning to determine the presence or absence of the metal target close to the detector.

According to the invention, the reference coil has, for example, a configuration determined so as to present an almost zero mutual inductance with respect to the detection coil and the metal target. In this case, the reference coil has, for example, an eight configuration.

According to another particular feature of the invention, the detection coil has an annular winding.

According to another particular feature, the detection coil and the reference coil are positioned coaxially.

According to another particular feature, the switch is an analogue electronic switch.

Other characteristics and advantages will become apparent from the detailed description that follows with reference to an embodiment given by way of example and represented by the appended drawings in which.

Figure 2:
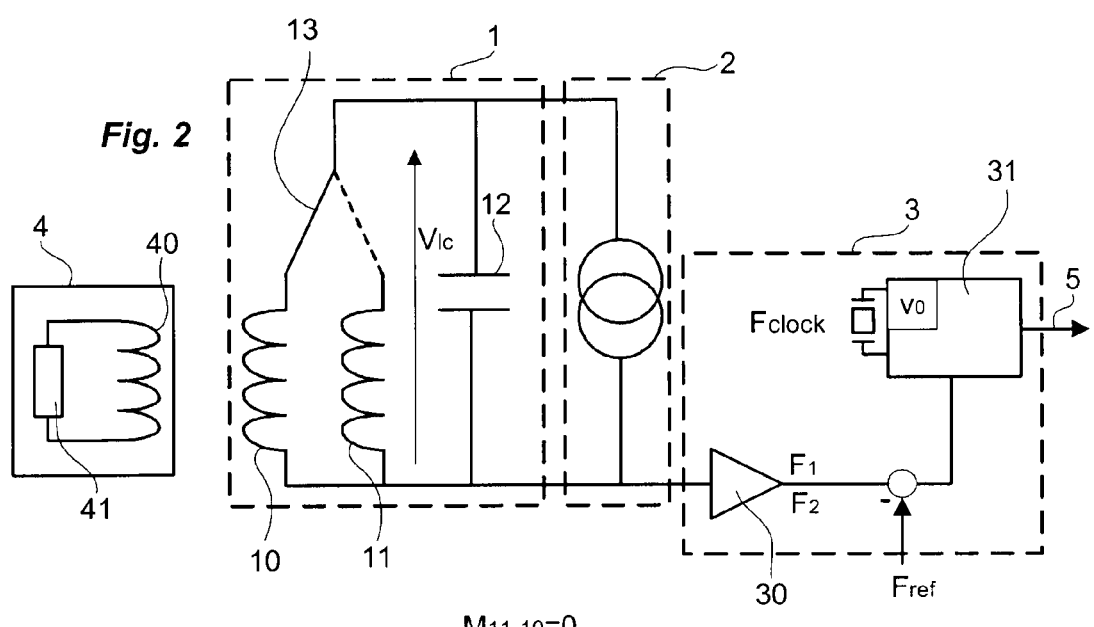
FIG. 2 represents the schematic diagram of the inventive detector.

The inventive detector comprises an oscillating circuit 1 of parallel LC type, excited with resonance, for example, by a current generator 2 able to send to the oscillating circuit 1 a current whose frequency must be tuned to the resonance frequency of the oscillating circuit 1 and processing means 3 making it possible to supply a binary output signal indicating the presence or absence of a metal target 4 close to the detector. In FIG. 2, the target 4 is represented in the form of a circuit comprising a coil 40 and a resistor 41.

The oscillating circuit 1 of the detector comprises two coils 10, 11 and a capacitor 12 common to both coils having a determined capacitance and fitted in parallel with the two coils 10, 11. The two coils are manufactured from the same technology and are, for example, placed coaxially.

A first coil is a detection coil 10 which is sensitive to the proximity of a metal target 4 when it is connected to the oscillating circuit 1. A second coil is a reference coil 11 with low sensitivity to the proximity of the target 4. In other words, the reference coil 11 is arranged to present a mutual inductance M that is substantially lower with respect to the target 4 to be detected than that of the detection coil with respect to this same target 4.

Figure 1:
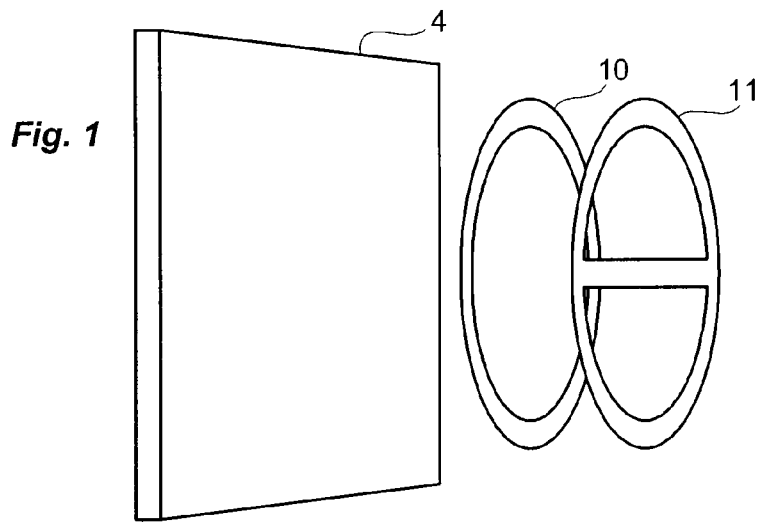
FIG. 1 illustrates the principle employed in the invention.

Referring to FIG. 1, the detection coil 10 has a conventional winding, with an annular or square shape to maximize the magnetic coupling coefficient with the target 4 when the target 4 is located within range of the detector. Other shapes can be envisaged, taking into account, for example, the shape of the detector casing.

For low sensitivity to the metal target when connected, the reference coil 11 can be positioned in a determined manner in the detector relative to the detection coil 10. The reference coil 11 is thus, for example, placed behind the detection coil so as to minimize the coupling with the target when the latter is in range of the detector (FIG. 1). In this configuration, the reference coil 10 can also take an annular or square shape and be identical to the detection coil 10. This configuration is particularly well suited to non-submersible detectors.

Figure 3:
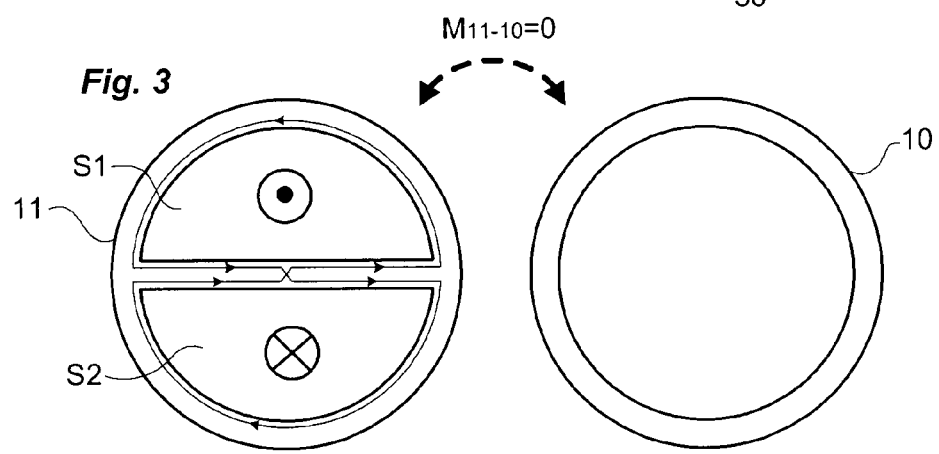
FIG. 3 represents the two coils employed in the inventive detector.

As a variant, the reference coil 11 can be constructed so as to intrinsically present an almost zero mutual inductance $(M_{11\text{-}10})$ both with reference to the target 4 but also with respect to the detection coil 10. For this, the reference coil 11 can comprise, for example, two windings connected in series, wound in reverse direction and of sections S1 and S2 that are equal so as to be able to form two magnetic fields in opposite directions when it is connected (FIG. 3). Referring to FIG. 3, the reference coil 11 has, for example, an eight configuration. Other configurations can, of course, be envisaged, provided that the resultant flux generated through this coil is zero or almost zero when it is connected in the presence of the target 4 and of the detection coil 10. The use of a reference coil 11 having a determined intrinsic configuration as described below is particularly appreciated in the case where the detector is submerged. Of course, to minimize as far as possible the coupling between the target and the reference coil, the reference coil 11 having this particular shape can also be placed behind the detection coil 10 as represented in FIG. 1.

According to the invention, the detector also comprises processing means 3 making it possible to detect the presence or absence of a metal target 4 close to the detector. The processing means 3 supply, for example, an output signal 5 which can be, for example, a binary signal indicating the presence or absence of a target 4 close to the detector. The processing means comprise a detection stage 30, for example, for amplifying and shaping the detection signal received from the oscillating circuit 1 and a processing unit 31 for analyzing the received signal and deciding on the state of the detection. These processing means 3 are common to both coils 10, 11.

According to the invention, the oscillating circuit comprises a switch 13 making it possible to alternately connect the detection coil 10 and the reference coil 11 in parallel to the capacitor 12. This type of switch 13 is, for example, an analogue electronic switch. The switch 13 is driven by a switching command originating, for example, from the processing means 3. It therefore makes it possible to switch the oscillation frequency of the detector between two values according to the values of the inductances of the two coils 10, 11, according to the formula:

$$F = 1/2\pi\sqrt{LC}$$

According to the invention, from the measured oscillation voltage $V_{LC}$, the processing means 3 therefore alternately determine the oscillation frequencies $F_1$ and $F_2$ depending on the position of the switch. For each measurement, the processing means 3 subtract a fixed reference frequency $F_{REF}$ in order to enhance the accuracy/time of measurement ratio. In practise, the acquisition time needed to measure a frequency F is given by the following relation:

$$t_{acq} = \frac{F}{dF \times F_{clock}}$$

in which F represents the measured frequency, dF the resolution on the measured frequency and $F_{clock}$ the counting frequency. To reduce the acquisition time $t_{acq}$ one inexpensive possibility therefore involves reducing the frequency to be measured F by subtracting from it a reference frequency $F_{REF}$.

The processing unit 31 therefore determines both $F_1-F_{REF}$ and $F_2-F_{REF}$ then calculates the difference between these two expressions. Using a comparator, the calculated difference is then compared to a stored threshold value $v_0$ to decide on the presence or absence of a metal target 4 close to the detector. The threshold value $v_0$ is obtained in a prior learning step and stored in storage means of the processing unit 31 of the detector. The learning step is carried out by positioning the metal target in range and by storing the difference $v_0$ between the duly measured frequencies $F_1$ and $F_2$.

Once the learning is completed, the processing unit 31 constantly compares the difference $F_1-F_2$ to the threshold $v_0$ and consequently generates an output signal 5 representative of the presence or absence of a metal target 4 close to the detector.

Obviously it is possible, without departing from the context of the invention, to imagine other variants and refinements of detail and similarly envisage the use of equivalent means.

The invention claimed is:

1. Inductive proximity detector comprising:
a generator;
an oscillating circuit excited with resonance generated by the generator and including
a detection coil configured to detect a metal target,
a reference coil which presents a mutual inductance with respect to the metal target to be detected that is substantially lower than that of the detection coil with respect to the metal target,
a switch having two positions to connect each coil alternately, and
a capacitor common to both coils and connected in parallel with both coils; and
processing means connected to the coils for determining the presence or absence of the metal target close to the detector based on the detection coil.

2. The inductive proximity detector according to claim 1, wherein the processing means is common to both coils.

3. The inductive proximity detector according to claim 1, wherein the generator is common to both coils and connected in parallel to both coils.

4. The inductive proximity detector according to claim 1, wherein the processing means comprise means of determining a frequency of a signal measured when the switch is in each of its positions.

5. The inductive proximity detector according to claim 4, wherein the processing means subtracts a reference frequency ($F_{ref}$) from each of a first measured frequency ($F_1$) and a second measured frequency ($F_2$).

6. The inductive proximity detector according to claim 1, wherein the processing means determines a frequency difference from oscillation frequencies ($F_1$, $F_2$) of the oscillating circuit for each position of the switch and compares the difference obtained with a threshold value ($v_0$) obtained from learning to determine the presence or absence of the metal target close to the detector.

7. The inductive proximity detector according to claim 1, wherein the reference coil has a configuration that is determined so as to present an almost zero mutual inductance with respect to the detection coil and the metal target.

8. The inductive proximity detector according to claim 7, wherein the reference coil has a configuration in the shape of an "8".

9. The inductive proximity detector according to claim 1, wherein the detection coil has an annular winding.

10. The inductive proximity detector according to claim 1, wherein the detection coil and the reference coil are positioned coaxially.

11. The inductive proximity detector according to claim 1, wherein the switch is an analogue electronic switch.

12. The inductive proximity detector according to claim 1, wherein the processing means is connected to a common terminal of the coils and the capacitor.

* * * * *